(12) United States Patent
Chandra et al.

(10) Patent No.: US 7,706,277 B2
(45) Date of Patent: Apr. 27, 2010

(54) SELECTIVE FLOW CONTROL

(75) Inventors: Sutapa Chandra, Karnataka (IN); Sachin Doshi, Karnataka (IN); Raju Krishnamurthi, Koramangala (IN)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 11/283,359

(22) Filed: Nov. 18, 2005

(65) Prior Publication Data

US 2007/0115824 A1    May 24, 2007

(51) Int. Cl.
*H04J 1/16* (2006.01)

(52) U.S. Cl. ...................................... 370/236

(58) Field of Classification Search ........................ None
See application file for complete search history.

(56) References Cited

U.S. PATENT DOCUMENTS

| | | | |
|---|---|---|---|
| 5,742,603 A | 4/1998 | Shafir et al. | |
| 5,742,606 A | 4/1998 | Iliadis et al. | |
| 5,784,559 A * | 7/1998 | Frazier et al. | 370/522 |
| 5,838,922 A | 11/1998 | Galand et al. | |
| 5,983,278 A | 11/1999 | Chong et al. | |
| 6,014,722 A | 1/2000 | Rudin et al. | |
| 6,026,075 A * | 2/2000 | Linville et al. | 370/236 |
| 6,154,464 A | 11/2000 | Feuerstraeter et al. | |
| 6,160,989 A | 12/2000 | Hendricks et al. | |
| 6,169,729 B1 | 1/2001 | Feuerstraeter | |
| 6,226,266 B1 | 5/2001 | Galand et al. | |
| 6,405,258 B1 | 6/2002 | Erimli et al. | |
| 6,859,435 B1 | 2/2005 | Lee et al. | |
| 6,882,622 B1 * | 4/2005 | Donoghue | 370/229 |
| 6,957,269 B2 | 10/2005 | Williams et al. | |
| 6,970,424 B2 | 11/2005 | Fawaz et al. | |
| 6,980,520 B1 * | 12/2005 | Erimli | 370/236 |
| 6,981,054 B1 | 12/2005 | Krishna | |
| 7,136,351 B2 | 11/2006 | Metin et al. | |
| 7,212,534 B2 | 5/2007 | Kadambi et | |
| 7,269,139 B1 * | 9/2007 | Williams et al. | 370/235 |
| 7,379,422 B2 * | 5/2008 | Nation | 370/230.1 |
| 7,436,773 B2 * | 10/2008 | Cunningham | 370/236 |
| 2002/0141427 A1 | 10/2002 | McAlpine | |
| 2003/0123393 A1 | 7/2003 | Feuerstraeter et al. | |
| 2005/0174941 A1 * | 8/2005 | Shanley et al. | 370/235 |

(Continued)

FOREIGN PATENT DOCUMENTS

CA          2322406         4/2001

(Continued)

OTHER PUBLICATIONS

IEEE Comp. Society, IEEE Standards 802.3, Part 3: "Carrier sense multiple access . . . , Annex 31B" MAC Control Pause operation IEEE Std 802.3, Mar. 8, 2002, Section Two, pp. 571-580.

(Continued)

*Primary Examiner*—Frank Duong (57) ABSTRACT

In an embodiment, a method is provided. The method of this embodiment provides transmitting data from a source node to a destination node, receiving a special flow control pause frame transmitted by the destination node in response to the destination node detecting a flow modification condition, and adjusting transmission of the data to the destination node in accordance with information included in the special flow control pause frame.

12 Claims, 5 Drawing Sheets

U.S. PATENT DOCUMENTS

2005/0213500 A1* 9/2005 Gaur .......................... 370/229

FOREIGN PATENT DOCUMENTS

| DE | 10123821 A1 | 12/2001 |
| --- | --- | --- |
| WO | 01/15449 A1 | 3/2001 |

OTHER PUBLICATIONS

Intel Corp., Application Note, Flow Control in IFX1010 and IXF1110 10-port Gigabit Ethernet Media Access Controllers, Apr. 28, 2002, pp. 5-8.

International Search Report received for PCT Patent Applicaton No. PCT/US2002/41566, mailed on Feb. 19, 2004, 9 pages.

Gummalla, Ajay Chandra V. et al., "An Access Protocol for a Wireless Home Network", IEEE Wireless Communications and Networking Conference, New Orleans, LA, USA, vol. 3, 1999 pp. 1392-1396.

Noureddine, W. et al., "Selective Back-Pressure in Switched Ethernet LANS", IEEE Global Telecommunications Conference,1999, vol. 2, pp. 1256-1263.

Roussos, J. K. et al., "Congestion Control Protocols for Interconnected LANs Supporting Voice and Data Traffic", Computer Communications, Elsevier Science B.V., vol. 17, No. 1, 1994, pp. 25-34.

* cited by examiner

SELECTIVE FLOW CONTROL

FIELD

Embodiments of this invention relate to selective flow control.

BACKGROUND

When a source node sends packets to a destination node in a communications network, packets may be stored in an input buffer of a network component where the packets may be retrieved and may be processed by the destination node. If a source node transmits packets to a destination node faster than the destination node can process the packets, congestion at the destination node may occur as traffic in its input buffer builds up. Therefore, flow control may be applied to control the traffic from the source node to the destination node.

An example of a flow control scheme is described in the IEEE (Institute of Electrical and Electronics Engineers, Inc.) 802.3 specification, IEEE Std. 802.3, 2002 Edition, current edition published on Mar. 8, 2002. Under the Ethernet flow control scheme, when a destination node becomes congested, the destination node may send a flow control pause frame to the source node. The flow control pause frame may signal the source node to stop all traffic to the destination node. In some cases, however, this may not be desirable.

DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where examples may be provided, it should be understood that the examples are not to be construed as exhaustive, and do not limit embodiments of the invention to the examples described and/or illustrated.

As used herein, the following terms and definitions are used:

A "network controller" as referred to herein relates to a device which may be coupled to a communication medium to transmit data to and/or receive data from other devices coupled to the communication medium, i.e., to send and receive network traffic. Such a network controller may communicate with other devices according to any one of several data communication formats such as, for example, communication formats according to versions of IEEE Std. 802.3, IEEE Std. 802.11, IEEE Std. 802.16, Universal Serial Bus, Firewire, asynchronous transfer mode (ATM), synchronous optical network (SONET) or synchronous digital hierarchy (SDH) standards.

A "network component" refers to a component in a system that controls how network data is accessed. In an embodiment, a network component may comprise, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

A network controller may correspond to a network component. By way of example, network controller and network component may be implemented on a network interface card. Alternatively, network controller may be implemented on one source (e.g., NIC or motherboard, for example), and network component may be implemented on a chipset.

A "flow" refers to data having at least one common characteristic. For example, data may share the same connection context, or the same type of traffic. Flow control refers to a process of adjusting the transmission of data from a one node to another node in a communications network, where the data may be associated with various flows.

A "packet" means a sequence of one or more symbols and/or values that may be encoded by one or more signals transmitted from at least one sender to at least one receiver.

Figure 1:
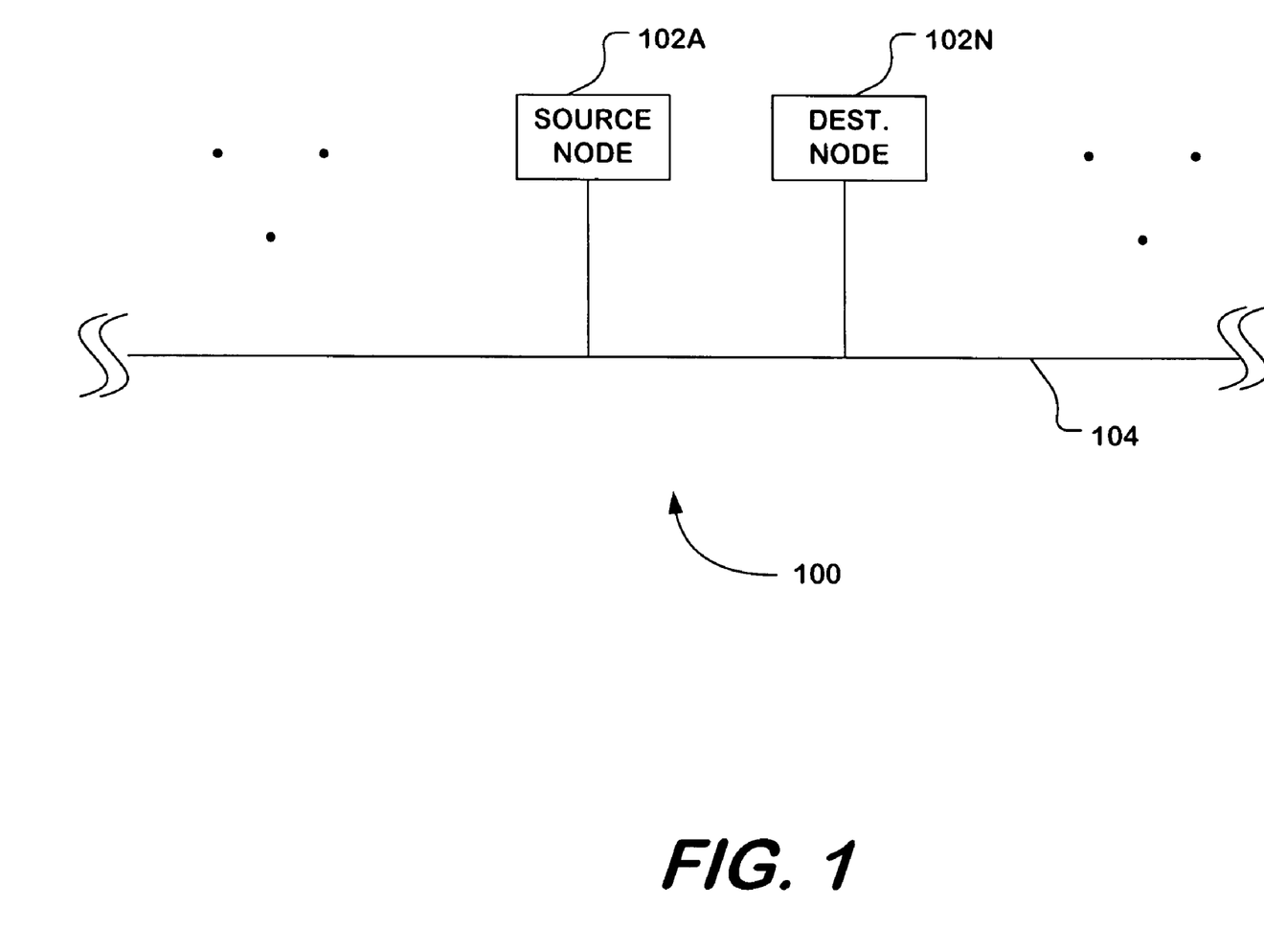
FIG. 1 illustrates a network according to an embodiment.

FIG. 1 is a block diagram illustrating a network 100 in accordance with embodiments of the invention. Network 100 may comprise a number of nodes 102A, ..., 102N, including a source node 102A, and a destination node 102N, connected by one or more communications media 104 (only one shown). A node refers to any device capable of communicating data, such as a computer, server, switch, router, bridge, gateway, personal digital assistant, mobile device and so forth. As used herein, a source node refers to a node that transmits data for delivery to destination node. A destination node as used herein refers to a node that is the intended recipient of data transmitted from a source node.

A communications medium 104 may include any medium capable of carrying information signals, such as twisted-pair cable, co-axial cable, fiber optics, radio frequencies, electronic, acoustic or optical signals, and so forth. Communication medium 104 may include any medium capable of carrying information signals, such as twisted-pair wire, co-axial cable, fiber optics, radio frequencies, optical and/or electrical cables, although many alternatives are possible. For example, communication medium 104 may comprise air and/or vacuum, through which nodes 102A, ... 102N may wirelessly transmit and/or receive sets of one or more signals.

In general operation, data may be generated from an originating node for transmission to one or more intended recipients, herein called target nodes. Originating node may send data to target node(s) through one or more intermediate nodes, such as routers and/or switches. Originating node may send the data to intermediate nodes. Intermediate nodes may receive the data, store it briefly, and pass it to the next intermediate node or to a target node. Target node may eventually receive the data and may use it to reproduce the original data sent by originating node. As used herein, a source node 102A may refer to an originating node or an intermediate node that transmits data; and a destination node 102N may refer to an intermediate node or a target node, that receives data. (If a destination node transmits data back to a source node, then the destination node becomes a source node, and a source node becomes a destination node.)

Figure 2:
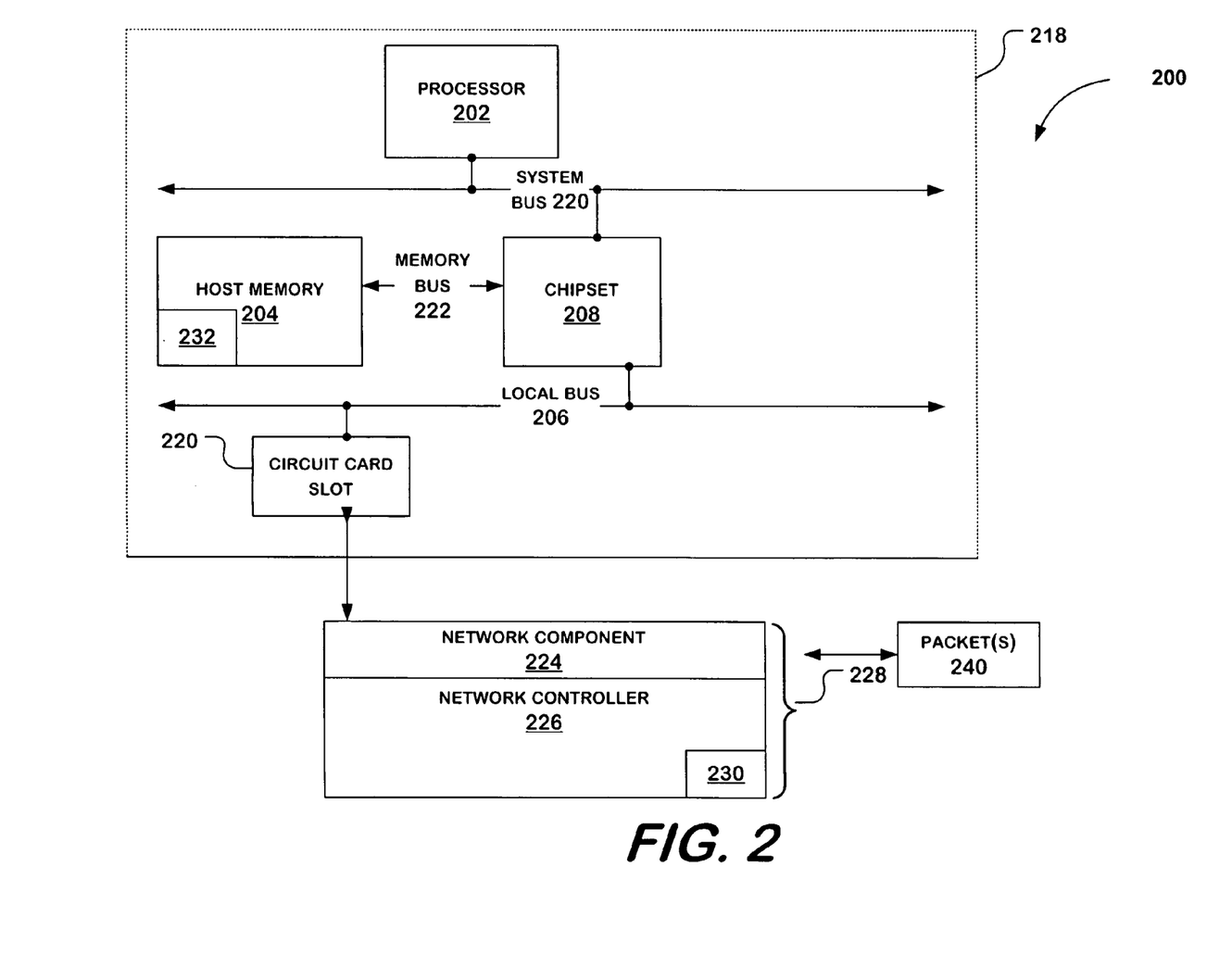
FIG. 2. illustrates a system according to an embodiment.

Each node 102A, ..., 102N may comprise system 200 as illustrated in FIG. 2. System 200 may comprise one or more processors 202 (only one shown). A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Examples of processors include the Intel® Pentium® family of processors, commercially available from Intel® Corporation.

Processor 202 may be part of an SMP (symmetrical multi-processing) system, and may comprise, for example, an Intel® Xeon™ processor, commercially available from Intel® Corporation. Of course, alternatively, any of processor 202 may comprise another type of processor, such as, for example, a microprocessor that is manufactured and/or commercially available from Intel® Corporation, or a source other than Intel® Corporation, without departing from embodiments of the invention.

Memory 204 may store machine-executable instructions 232 that are capable of being executed, and/or data capable of being accessed, operated upon, and/or manipulated by, for example, processor 202 and/or logic 230. "Machine-executable instructions" as referred to herein relate to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect. Memory 204 may, for example, comprise read only, mass storage, random access computer-accessible memory, and/or one or more other types of machine-accessible memories.

Chipset 208 may comprise a host bridge/hub system that may couple processor 202, and host memory 204 to each other and to local bus 206. Chipset 208 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 208 may comprise an input/output control hub (ICH), and a memory control hub (MCH), although embodiments of the invention are not limited by this. Chipset 208 may communicate with memory 204 via memory bus 222 and with host processor 202 via system bus 220. In alternative embodiments, host processor 202 and host memory 204 may be coupled directly to bus 206, rather than via chipset 208.

System 200 may additionally comprise one or more network controllers 226 (only one shown). Data transmitted between source node 102A and destination node 102N may be encapsulated in packets 240, which may be processed by network controller 226.

Network controller 226 may comprise logic 230 to perform operations described herein. Logic 230 may comprise hardware, software, or a combination of hardware and software (e.g., firmware). For example, logic 230 may comprise circuitry (i.e., one or more circuits), to perform operations described herein. Logic 230 may be hardwired to perform the one or more operations. For example, logic 230 may comprise one or more digital circuits, one or more analog circuits, one or more state machines, programmable logic, and/or one or more ASIC's (Application-Specific Integrated Circuits).

Alternatively or additionally, logic 230 may be embodied in machine-executable instructions 232 stored in a memory, such as memory 204, to perform these operations. Alternatively or additionally, logic 230 may be embodied in firmware. Logic may be comprised in various components of system 200, including network controller 226 (as illustrated), chipset 208, processor 202, and motherboard 218. Logic 230 may be used to perform various functions by various components as described herein.

Network controller 226 may have a corresponding network component 224. In an embodiment, network component 224 (e.g., MAC layer) may be implemented on network controller 226, although embodiments of the invention are not limited in this respect. For example, network component 224 (e.g., MAC layer) may instead be integrated with chipset 208 without departing from embodiments of the invention.

In an embodiment, network controller 226 may be comprised on system motherboard 218. Rather than reside on motherboard 218, network controller 226 may be integrated onto chipset 208, or may instead be comprised in a circuit card 228 (e.g., NIC or network interface card) that may be inserted into a circuit card slot 220 on motherboard 218.

System 200 may comprise more than one, and other types of memories, buses, processors, and network controllers. For example, processor 202, memory 204, and busses 206, 210, 212 may be comprised in a single circuit board, such as, for example, a system motherboard 218, but embodiments of the invention are not limited in this respect.

Figure 3:
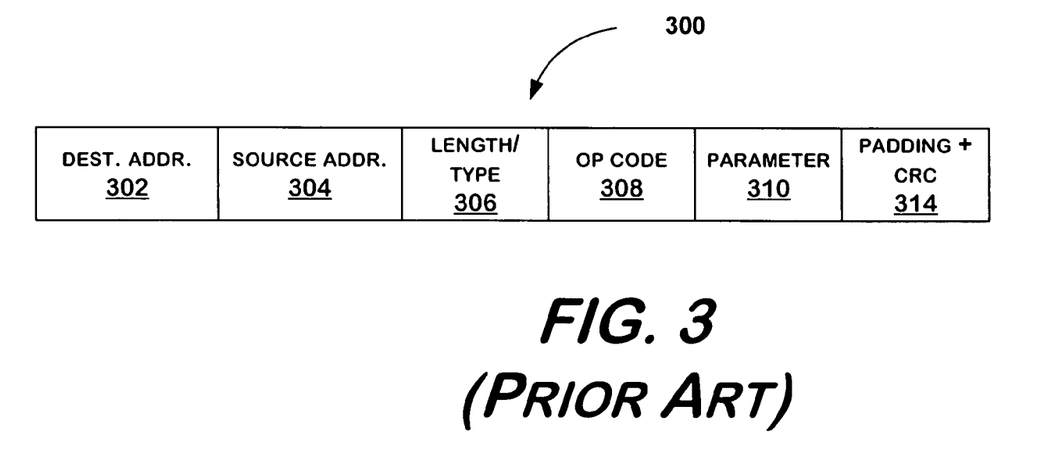
FIG. 3 illustrates a flow control pause frame.

FIG. 3 illustrates an example of a flow control pause frame 300 in accordance with the IEEE 802.3 specification. Flow control pause frame 300 may comprise a destination address 302, a source address 304, a length/type field 306, an op code field 308, a parameter field 310, and padding/CRC (cyclic redundancy check) field 314.

Figure 4:
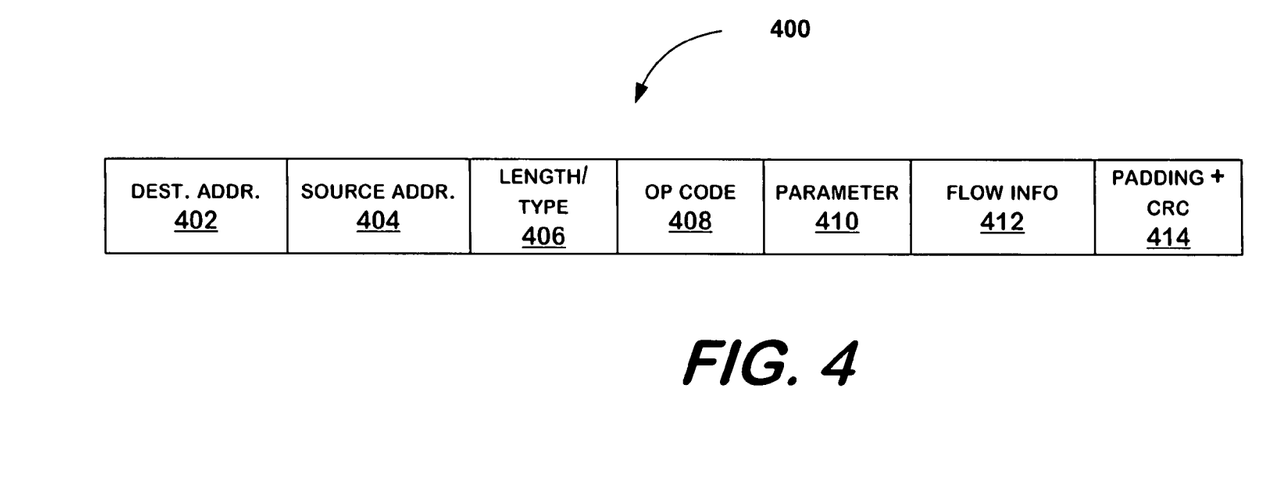
FIG. 4 illustrates a special flow control pause frame in accordance with an embodiment of the invention.

FIG. 4 illustrates an example of a special flow control pause frame 400 in accordance with an embodiment of the invention. Special flow control pause frame 400 may include information to help a source node adjust transmission of data to a destination node. For example, special flow control pause frame 400 may include one or more flows to adjust, the rate of adjustment, and whether the adjustment is to increase or decrease the rate or the amount of the flow. By way of example, in an embodiment, special flow control pause frame 400 may comprise a destination address 402, a source address 404, a length/type field 406, an op code field 408, a parameter field 410, a flow information field 412, and padding/CRC field 414. In an embodiment, as described below, flow information field 412 may indicate a flow to be stopped, although embodiments of the invention are not limited in this respect. For example, in certain embodiments, special flow control pause frame 400 may comprise an additional flow control field that indicates what modification is to occur on the flow identified in flow information field 412. For example, this additional control field may indicate that the flow identified in flow information field 412 is to be stopped, increased, or decreased. Other flow control fields may be included and defined.

Figure 5:
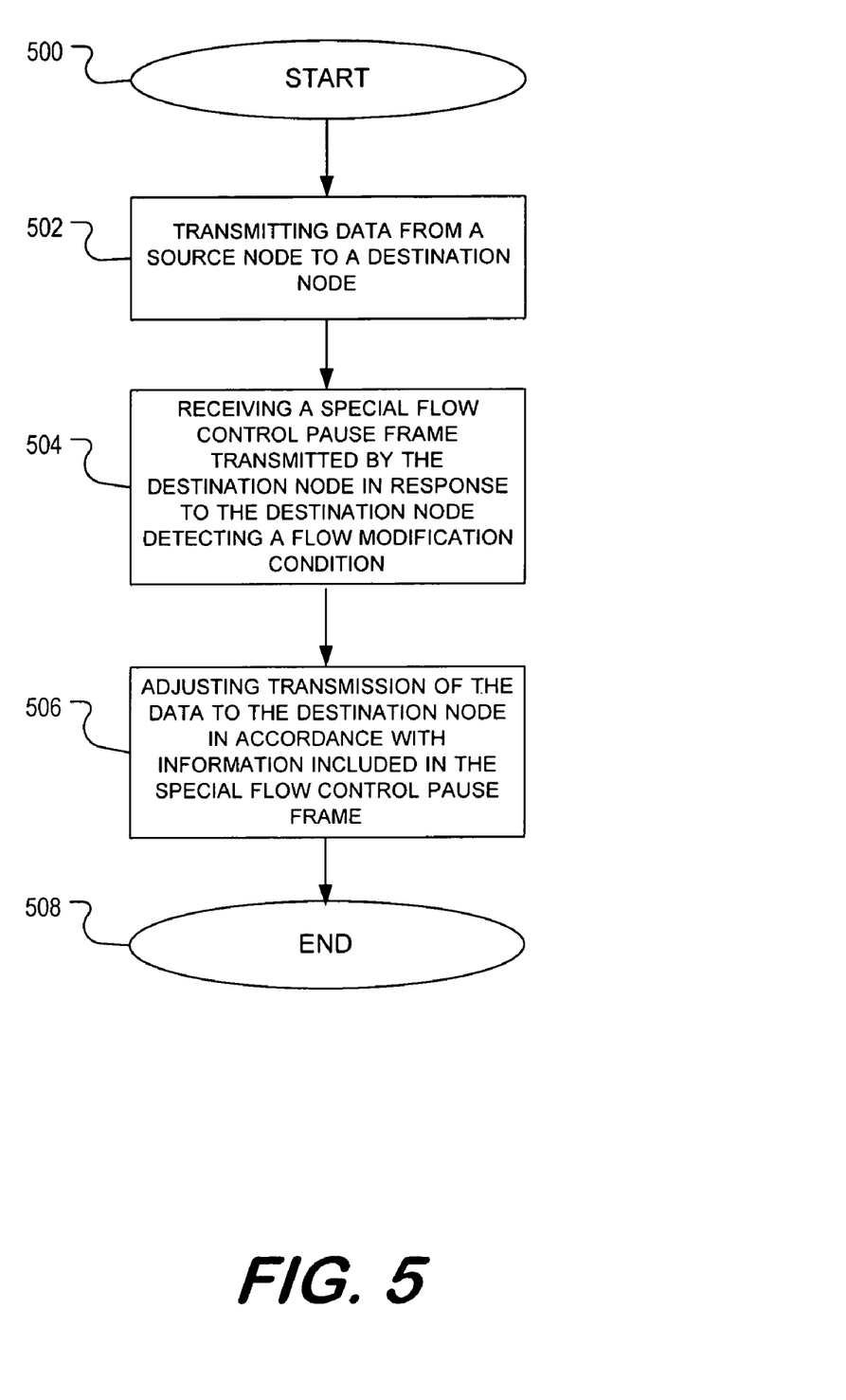
FIG. 5 is a flowchart illustrating a method according to an embodiment.

A method according to an embodiment is illustrated in the flowchart of FIG. 5. The method of FIG. 5 begins at block 500 and continues to block 502 where the method comprises transmitting data from a source node to a destination node. For example, source node 102A may transmit data to destination node 102N. Data may be associated with one or more flows. Examples of flows include L2 traffic, IP (Internet Protocol) traffic, and IPM (IP Multicast) traffic.

At block 504, the method comprises receiving a special flow control pause frame transmitted by the destination node in response to the destination node detecting a flow modification condition. A flow modification condition refers to a condition that indicates a need to adjust the transmission of data. For example, destination node 102N may transmit special flow control pause frame 400 in response to destination node 102N detecting a flow modification condition. An example of a flow modification condition is a congesting flow. A congesting flow refers to flow that is a source of congestion. A flow may be a source of congestion if, for example, a memory (e.g., a buffer) that stores data associated with the flow exceeds its capacity, or if the capacity of data associated with a particular flow has exceeded a specified limit. Of course, other examples of a congesting flow may exist.

At block 506, the method comprises adjusting transmission of the data transmitted to the destination node in accordance with information included in the special flow control pause frame. For example, source node 102A may adjust transmission of the data to destination node 102N in accordance with information included in special flow control pause frame 400. For example, special flow control pause frame 400 may identify IPM traffic in its flow information field 412, and source node 102A may adjust transmission of the data to destination node 102N by excluding data associated with IPM traffic. The exclusion of data may be defined for a particular implementation or may be defined by an additional special flow control pause frame, for example.

The method ends at block 508.

Figure 6:
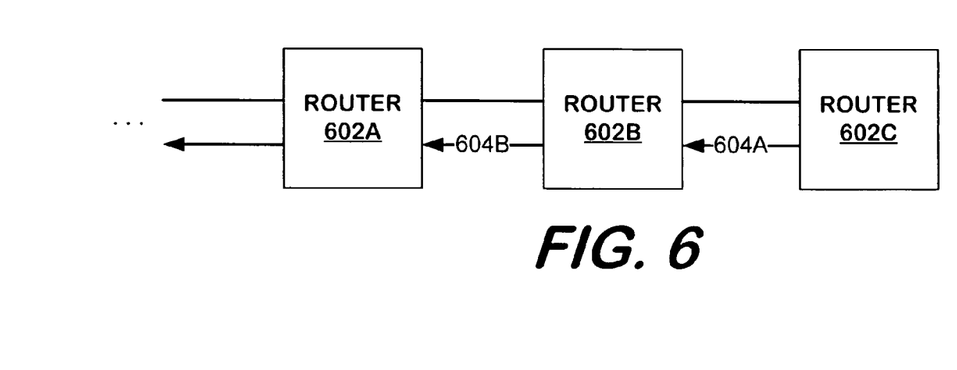
FIG. 6 illustrates a router embodiment.

FIG. 6 illustrates a router embodiment in which a plurality of routers 602A, 602B, 602C may be used in a system, such as system 100, to transmit data. While 3 routers 602A, 602B, 602C are illustrated, embodiments of the invention are not limited to this number. In other embodiments, more routers or less routers may be used without departing from embodiments of the invention. Furthermore, FIG. 6 merely illustrates one embodiment of the invention, and does not restrict embodiments of the invention to this example. For example, in another embodiment, switches, rather than routers, may be used. Special flow control pause frames 604A, 604B are described below.

Figure 7:
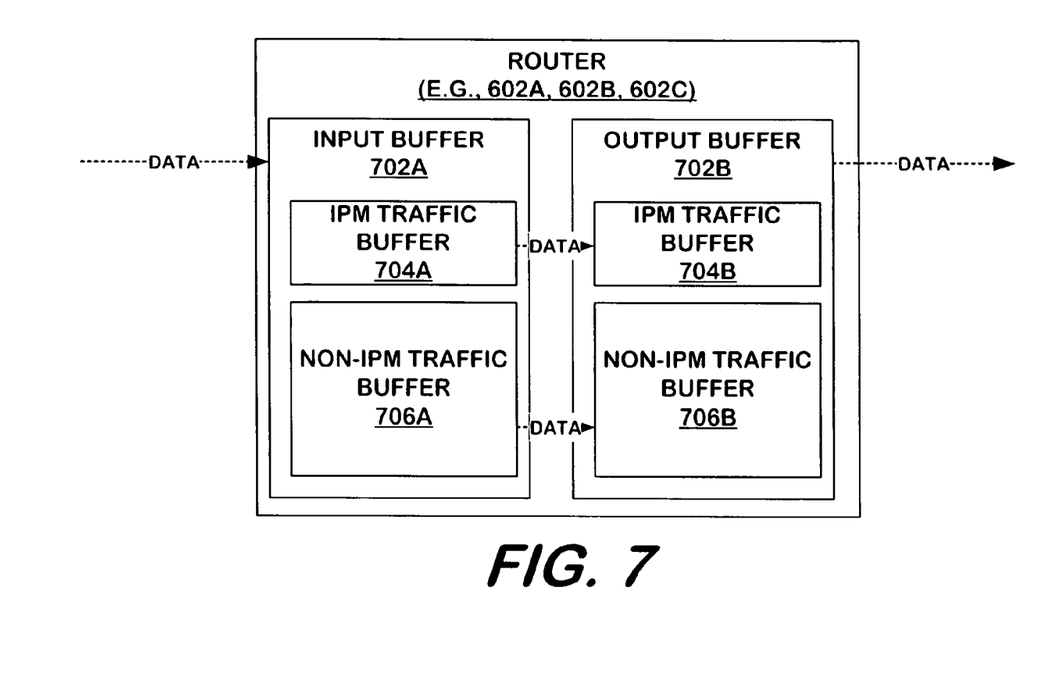
FIG. 7 illustrates a router embodiment in accordance with FIG. 6.

As illustrated in FIG. 7, routers 602A, 602B, 602C may comprise input buffer 702A and output buffer 702B associated with network component to store data. As data is received at router 602A, 602B, 602C, data may be stored in input buffer 702A. When data is ready to be transmitted to another node, data may be stored in output buffer 702B.

In an embodiment, when router 602A, 602B, 602C receives IPM traffic (i.e., congesting traffic), it may store the IPM traffic in its input buffer 702A, store the IPM in its output buffer 702B when data is ready to be transmitted, replicate the IPM traffic multiple times, and forward it to one or more nodes. Since IPM packets may reside in buffers 702A, 702B for a longer period of time due to this requirement, IPM packets in a router 602A, 602B, 602C may oftentimes result in congestion at a node.

Alternatively, routers 602A, 602B, 602C may comprise a central buffer from where data can be written and read. The central buffer can be shared between IPM traffic (i.e., congesting traffic) and non-IPM traffic (i.e., non-congesting traffic) with separate usage limits, for example.

Typically, therefore, as illustrated in FIG. 7, the input buffer 702A and output buffer 702B of router 602A, 602B, 602C may be partitioned into IPM traffic buffer 704A, 704B and non-IPM traffic buffer 706A, 706B. When data in IPM traffic buffer 704A of input buffer 702A is ready to be transmitted (e.g., replicated) to other node(s), data may be moved into IPM traffic buffer 704B of output buffer 702B. Likewise, when data in non-IPM traffic buffer 706A of input buffer 702A is ready to be transmitted (e.g., replicated) to other node(s), data may be moved into non-IPM traffic buffer 706B of output buffer 702B. Consequently, different flows may be controlled independently.

In embodiments of the invention, if one of routers 602A, 602B, 602C, for example router 602C, detects a flow modification condition, which may comprise IPM traffic buffer 704A of input buffer 702A exceeding a specified capacity, router 602C may send a special flow control pause frame 604A to router 602B, where special flow control pause frame 604A may indicate, for example, IPM traffic as the congesting traffic. In response to receiving special flow control pause frame 604A, router 602B may continue transmitting non-IPM traffic to router 602C, but stop transmitting IPM traffic to router 602C. Alternatively, if other control fields are included, such as a control field to indicate how the identified flow is to be modified, router 602B may act in accordance with such information. Each of special flow control pause frames 604A, 604B, 604C may be similar to special flow control pause frame 400.

As router 602B becomes congested with IPM traffic in its IPM traffic buffer 704B of output buffer 702B, its IPM traffic buffer 704A of input buffer 702A may also become congested because as IPM traffic buffer 704B of output buffer 702B reaches its capacity, data can no longer be moved from IPM traffic buffer 704A of input buffer 702A into IPM traffic buffer 704B of output buffer 702B. Consequently, router 602B may detect a flow modification condition, and send a special flow control pause frame 604B to router 602A. In response to receiving special flow control pause frame 604B, router 602A may continue transmitting non-IPM traffic to router 602B, but stop transmitting IPM traffic to router 602B.

Eventually, the special flow control pause frame 604A, 604B will reach a source router, and IPM traffic will be completely stopped in the network until the flow modification condition is over. The flow modification condition may be over when any one of nodes (e.g., routers) that sent the condition detects that the flow modification condition is over (e.g., the buffers are not full). Meanwhile, non-IPM traffic may continue to flow through the network.

CONCLUSION

Therefore, in an embodiment, a method comprises transmitting data from a source node to a destination node, receiving a special flow control pause frame transmitted by the destination node in response to the destination node detecting a flow modification condition, and adjusting transmission of the data to the destination node in accordance with information included in the special flow control pause frame.

Embodiments of the invention may provide a flexible approach to flow control in a network. By defining one or more control fields in a special flow control pause frame, nodes may adjust the transmission of data in accordance with these control fields, rather than completely stopping the transmission of all data. For example, a node may completely stop the transmission of a particular flow identified by the flow information in the packet. Other embodiments allow other action to be taken in accordance with one or more other control fields in the special flow control pause frame.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method, comprising:
   detecting congestion at a network device,
   at the network device, constructing a pause frame, the pause frame comprising an Ethernet source address, an Ethernet destination address, length/type field, an opcode field, a padding/CRC (Cyclic Redundancy Check) field, and a flow information field specifying a flow of at least one of the following: an Internet Protocol flow and an Internet Protocol Multicast (IPM) flow; and
   causing transmission of the constructed pause frame toward a device corresponding to the Ethernet destination address.

2. The method of claim 1,
   wherein the flow information field comprises a field specifying an Internet Protocol Multicast (IPM) flow.

3. The method of claim 1,
   further comprising:
      receiving the constructed pause frame at the device corresponding to the Ethernet destination address; and
      pausing transmission of only the flow specified in the flow information field to the network device.

4. The method of claim 1,
   wherein the constructed pause frame comprises a parameter field.

5. The method of claim 1,
   wherein the constructed pause frame comprises a field specifying a type of modification of the flow specified in the flow information field, the modification comprising at least one of: increase and decrease.

6. The method of claim 1,
   further comprising allocating different respective buffers for different respective flows specified in the flow information field.

7. A network device, comprising:
   circuitry to:
      detect congestion at a network device,
      at the network device, construct a pause frame, the pause frame comprising an Ethernet source address, an Ethernet destination address, length/type field, an opcode field, a padding/CRC field (Cyclic Redundancy Check), and a flow information field specifying an Internet Protocol flow; and
      cause transmission of the constructed pause frame toward a device corresponding to the Ethernet destination address.

8. The device of claim 7,
   wherein the flow information field comprises a field specifying an Internet Protocol Multicast (IPM) flow.

9. The device of claim 7,
   wherein the circuitry comprises circuitry to:
      receive the constructed pause frame at the device corresponding to the Ethernet destination address; and
      pause transmission of only the flow specified in the flow information field to the network device.

10. The device of claim 7,
    wherein the constructed pause frame comprises a parameter field.

11. The device of claim 7,
    wherein the constructed pause frame comprises a field specifying a type of modification of the flow specified in the flow information field, the modification comprising at least one of: increase and decrease.

12. The device of claim 7,
    further comprising circuitry to allocate different respective buffers for different respective flows specified in the flow information field.

* * * * *